United States Patent
Hulden et al.

(10) Patent No.: US 10,821,679 B2
(45) Date of Patent: Nov. 3, 2020

(54) CONDITIONING DOCTOR BLADE FOR FIBER WEB MACHINE

(71) Applicant: Valmet Technologies, Inc., Espoo (FI)

(72) Inventors: Håkan Hulden, Espoo (FI); Harri Ruotsalainen, Varkaus (FI)

(73) Assignee: VALMET TECHNOLOGIES, INC., Espoo (FI)

( * ) Notice: Subject to any disclaimer, the term of this patent is extended or adjusted under 35 U.S.C. 154(b) by 83 days.

(21) Appl. No.: 16/020,789

(22) Filed: Jun. 27, 2018

(65) Prior Publication Data
US 2019/0001585 A1 Jan. 3, 2019

(30) Foreign Application Priority Data
Jun. 29, 2017 (FI) .................................. 20175622

(51) Int. Cl.
*B29C 70/02* (2006.01)
*D21G 3/00* (2006.01)

(52) U.S. Cl.
CPC ........... *B29C 70/025* (2013.01); *D21G 3/005* (2013.01)

(58) Field of Classification Search
CPC ............ D21G 3/005; Y10T 428/24994; Y10T 428/249942; Y10T 428/249944; Y10T 428/249928; Y10T 428/3154; Y10T 428/24174; Y10T 442/668; Y10T 442/67; Y10T 442/673; B08B 1/00; B29C 70/025; B29C 70/205; B29C 70/24; B22F 2207/01; B29B 15/122
USPC ........... 428/292.1, 298.1, 298.7, 297.4, 119; 162/281, 272; 399/350; 15/256.5, 15/236.01; 156/244.23, 307.3; 427/180; 442/389, 391, 393; 264/136
See application file for complete search history.

(56) References Cited

U.S. PATENT DOCUMENTS

| | | | |
|---|---|---|---|
| 6,416,843 | B1 | 7/2002 | Rata et al. |
| 6,991,757 | B2 | 1/2006 | Rata et al. |
| 2002/0068162 | A1 | 6/2002 | Carrier |
| 2009/0221205 | A1 | 9/2009 | Matilainen et al. |

FOREIGN PATENT DOCUMENTS

| | | |
|---|---|---|
| CN | 202247522 U | 5/2012 |
| EP | 1295988 A1 | 3/2003 |
| FI | 101637 B | 7/1998 |
| FI | 117568 B | 11/2006 |

OTHER PUBLICATIONS

Finnish Search Report for FI20175622 dated Feb. 27, 2018.

*Primary Examiner* — Camie S Thompson
(74) *Attorney, Agent, or Firm* — Stiennon & Stiennon

(57) ABSTRACT

A conditioning doctor blade (11) for a fiber web machine contains a number of reinforcement fiber layers (24, 26) laminated on top of one another into an epoxy matrix (20), and silicon carbide particles (21), so that the reinforcement fiber layers (24, 26) have formed a fiber core (22) and surface fiber layers (23) on both sides of the fiber core (22). There is less epoxy matrix (20) in the fiber core (22) than in the surface fiber layers (23).

15 Claims, 4 Drawing Sheets

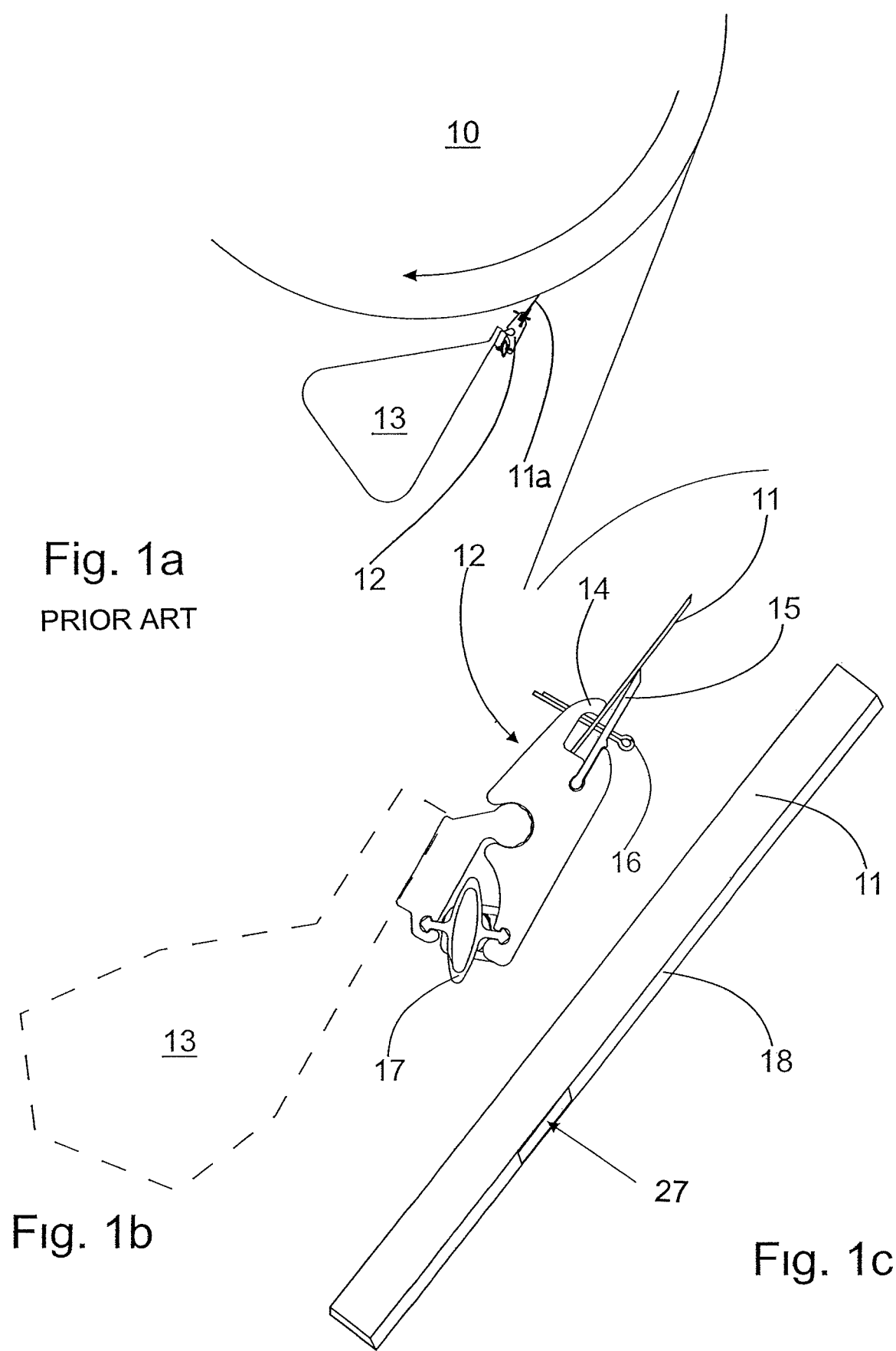

CONDITIONING DOCTOR BLADE FOR FIBER WEB MACHINE

CROSS REFERENCES TO RELATED APPLICATIONS

This application claims priority from Finnish App. No. FI 20175622 filed Jun. 29, 2017, and which is incorporated herein by reference.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a doctor blade for a fiber web machine, which doctor blade contains a number of reinforcement fiber layers laminated on top of one another into an epoxy matrix, and a layer which contains silicon carbide particles and fiberglass or carbon fibers, which is between the reinforcement fiber layers. A caring or conditioning doctor blade is presented in FI patent number 101637 which corresponds to U.S. Pat. No. 6,416,843 which is incorporated herein by reference.

SUMMARY OF THE INVENTION

The presented conditioning doctor blade aims to optimize the fiber orientation and resistance to heat, which has been accomplished by placing silicon carbide particles in the carbon fiber mat of the fiber core. In the prior art the particle distribution of the structure has turned out to be uneven, when the attachment of the silicon carbide particles to the carbon fiber has turned out to be problematic, and the resin/particle ratio has turned out to be difficult to control. As a result of this, clogging of the conditioning doctor blade has been detected, in which case the conditioning effect based on grinding is lost. In this way the conditioning doctor blade is only suited to certain roll surfaces.

The object of the present invention is to accomplish a novel kind of conditioning doctor blade for a fiber web machine, which doctor blade conditions the surface to be doctored uninterruptedly and which is suited to the doctoring of various types of surfaces. The characteristic features of the conditioning doctor blade according to the present invention are a number of reinforcement fiber layers laminated on top of one another to form an epoxy matrix, with a core that has less epoxy and the core having sides and on the sides silicon carbide particles. In a conditioning doctor blade, hereinafter more simply referred to as doctor blade, the fiber core is composed in a novel and surprising manner. This accomplishes a fiber core that is worn evenly and where the particle distribution can be made even. In this way, an effective cleaning zone is created in the doctor blade, which zone advantageously contains a number of layers. A better cleaning efficiency than previously is hence achieved without clogging. The other features of the doctor blade enable the use of the doctor blade with various types of surfaces. In this case, in practice the doctor blade can be placed in the doctor devices of most fiber web machine rolls.

BRIEF DESCRIPTION OF THE DRAWINGS

The invention is described below in detail by making reference to the enclosed drawings that illustrate some embodiments of the invention, in which:

FIG. 1a shows a side view of a prior art doctor device placed in connection with a roll, FIG. 1b shows a partial magnification of the device of FIG. 1a, with the doctor blade of the invention;

FIG. 1c shows part of the doctor blade according to the invention,

DESCRIPTION OF THE PREFERRED EMBODIMENTS

Figure 2A:
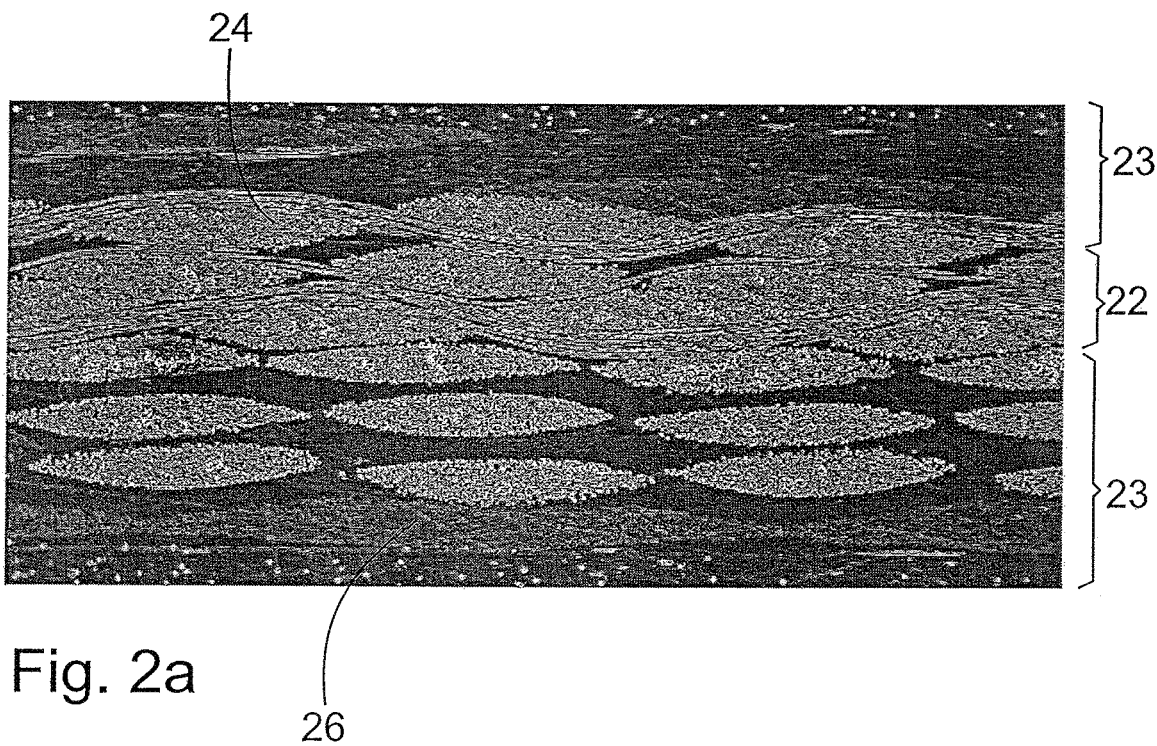
FIG. 2a shows a microscopic image of the structure of the doctor blade according to the invention.

FIG. 1a shows a prior art doctor device, which is intended for keeping the surface of a roll 10 clean. A doctor blade 11a is loaded against the surface of the roll 10, and the doctor blade 11a has been supported to a blade holder 12. Correspondingly, the blade holder 12 has been fastened to a doctor beam 13, which has been supported to the frame of a fiber web machine. Loose material can adhere so severely that the cleaning ability of an ordinary doctor blade is insufficient. On the other hand, an ordinary doctor blade can change the features of the surface of the roll in an unfavorable manner. In this case, a conditioning doctor blade, which has a grinding effect, is selected as the doctor blade. In this way, the adhered loose material can be removed, and at the same time the surface of the roll can be conditioned by grinding. A conditioning doctor blade avoids changes in the features of the surface of the roll and the dismounting of the roll from the machine for cleaning. However, there is still a need for a conditioning doctor blade, which would be suited to all types of roll surfaces: polymeric and fiber-reinforced surfaces as well as metal, ceramic and ceramic-metal surfaces.

FIG. 1b shows the doctor blade 11 according to the invention, adapted to the above-described position. The doctor blade is adapted to a gap formed by the jaw 14 of the blade holder 12 and a support plate 15. When the doctor blade 11 is loaded, it remains in place, but unintentional unfastening is prevented by means of a pin 16, which extends through the support plate 15, doctor blade 11 and jaw 14. This blade holder 12 has one loading hose 17 for loading the doctor blade 11 against the surface of the roll. The doctor blade can also be installed in another type of blade holder.

FIG. 1c shows part of the doctor blade 11 according to the invention. The thickness of the doctor blade has been exaggerated here. In practice, the thickness of the doctor blade is from one to two millimeters. Moreover, the cross-directional dimension of the fiber web machine is several meters while the dimension in the machine direction is usually 50-200 mm. In this case, the doctor blade can be reeled into a reel, and when installed in the blade holder, the doctor blade adapts to the shape of the surface of the roll. The doctor blade is, however, so stiff that the blade bevel 18 included in the doctor blade can be pressed against the surface of the roll. The doctor blade wears during operation. The conditioning doctor blade does not differ from an ordinary doctor blade by its external appearance, because the grinding particles are inside the doctor blade. Furthermore, the grinding particles are small.

The doctor blade 11 is intended for a fiber web machine as described above. The arrow 27 in FIG. 1c points to a point of the blade bevel 18. A microscopic image taken from this point is shown in FIG. 2a. The principle of the structure of the doctor blade is shown in FIGS. 3a-4b. The doctor blade 11 contains a number of reinforcement fiber layers 24 and 26 laminated on top of one another into an epoxy matrix 20. The doctor blade also contains silicon carbide (SiC) particles 21 in order to accomplish a conditioning grinding effect. After manufacture, the reinforcement fiber layers 24 and 26 have formed a fiber core 22 and surface fiber layers 23 on both sides of the fiber core 22. In the invention, there is less epoxy matrix 20 in the fiber core 22 than in the surface fiber layers 23. In this case, there is a fiber concentration with reduced epoxy matrix in the core area, in other words a matrix enrichment outside the core. The structure works without clogging, and there is little wear. Thus, the doctor blade 11 is made up of a fiber core 22 which defines a cross-machine length, a machine direction width, and a Z-direction thickness. The fiber core has a first side in the Z-direction and a second side opposite the first side in the Z-direction. Surface fiber layers 23 form two side parts which are bonded or integral with the fiber core 22 in the finished doctor blade 11 as shown in FIGS. 2a, and 3a-4b. In the figures two side parts are labeled 23 and are shown on either side of the fiber core 22. Thus, it can be said that one of the side parts 23 is bonded or integral with the first side of the fiber core, and the other side part 23 is bonded or integral with the second side of the fiber core. Both the fiber core and the side parts refer to a volume containing: fiber, an epoxy matrix, and possibly other contents such as SiC grit, resin, and voids. Weight percentages of epoxy matrix are found for a unit volume by dividing the weight of the epoxy matrix in the unit volume by the weight of the unit volume i.e., all the unit volume's constituents. A unit volume is some arbitrary volume e.g., a $mm^3$, which is representative of an object, or the entire volume of the object.

The amount of the epoxy matrix varies in different applications, but an ordinary doctor blade contains 40-50 percent by weight evenly across the entire thickness of the structure. In the invention, however, there is 10-25 percent, most advantageously 15-20 percent less epoxy matrix 20 in the fiber core 22 than in the surface fiber layers 23. In this case, the fiber core contains 30-35 percent by weight of epoxy matrix. Correspondingly, the surface fiber layers contain 35-45 percent by weight of epoxy matrix. In this case, the difference in the contents is significant, which is manifested in the functioning of the doctor blade.

The fiber core 22 includes 1-5, advantageously 2-4 fiberglass layers 24. First of all, fiberglass is less expensive than carbon fiber. Like fiberglass, carbon fiber is in mats that can be placed on top of each other easily. The orientation of the fibers can be determined accurately at the same time. On the other hand, fiberglass with reduced epoxy matrix wears in a controlled manner, without clogging. Thirdly, the conditioning features of the doctor blade can be influenced easily by the number of the fiberglass layers. Fourthly, the silicon carbide particles can be attached to fiberglass in a controlled manner.

The distribution of the content of the epoxy matrix can be adapted by performing manufacture in phases or by adjusting the amount of epoxy between the reinforcement fiber layers. The fiberglass mat 24 of the fiber core 22 of the doctor blade according to the invention surprisingly has a resin coating 25 in order to restrict the absorption of the epoxy matrix 20. In this case, all reinforcement fiber layers can be soaked in epoxy, placed in a press and pressed to become a complete product. The resin coating restricts the absorption of the epoxy matrix, whereby a core structure according to the invention is created, with the core structure containing less epoxy matrix than the rest of the structure. However, the added epoxy reacts with the resin coating, and all reinforcement fiber layers become cross-linked to form a uniform structure.

The features of the doctor blade can be adjusted by the number of the fiberglass layers of the fiber core. In the invention, the silicon carbide particles 21 are fastened to the resin coating 25. When manufacturing fiberglass mats, the silicon carbide particles can be run into the resin coating or fastened to the fiberglass mat in a separate phase. In this way, a pre-resinified fiberglass mat is formed, where the silicon carbide particles are evenly spread. At the same time, pre-treated fiberglass mats can be placed during manufacture to become a fiber core without additional work phases, which simplifies and expedites manufacture. An even distribution of the silicon carbide particles can also be ensured. Generally speaking, the fiber core contains evenly distributed but at the same time centrally located silicon carbide particles. Moreover, the amount of the epoxy matrix is smaller in the fiber core than elsewhere in the doctor blade. In this case, the grinding effect remains good while the wear of the doctor blade is, however, slower than earlier.

The grain size of a silicon carbide particle 21 is GRIT600 in the invention. In this case, the average diameter of a silicon carbide particle is 26 micrometers. Even though the grain size is small, the SiC concentration of the fiber core accomplishes both a grinding effect and a conditioning effect. At the same time, however, a scratching effect is avoided, since the matrix is free from silicon carbide particles. The doctor blade can hence be used with almost all types of roll surface materials. Moreover, the use can be continuous, and the replacement interval of the doctor blade can be extended.

Doctor blades according to the invention were compared to prior art doctor blades in a wear test. The test device in the wear test comprised a rotating roll coated with chilled cast iron, with the diameter of the roll corresponding to an actual roll but with a length of less than 500 mm. The width and thickness of the doctor blades were measured accurately. The doctor blades were placed side by side against the same roll. Each doctor blade was placed in its own short blade holder and loaded by means of weights independently of the other blade holders so that the load on each doctor blade corresponded to a linear load of 650 N/m. No lubrication showers were used. The doctor blades were run with this test arrangement at a speed of 1500 m/min for 20 hours, after which the doctor blades were measured again.

Doctor blades A and B represented prior art in the wear test. Both doctor blades comprised fiberglass mats and carbon fiber mats as reinforcement fiber layers, and silicon carbide particles. The silicon carbide particles had been placed in conjunction with one reinforcement fiber layer in the middle of the doctor blade. Doctor blade A was manufactured by bringing one of the reinforcement fiber layers into an epoxy bath, into which the silicon carbide particles had been added. The other layers were laid and soaked in epoxy. After soaking, the reinforcement fiber layers were laminated together under an elevated pressure and temperature. Due to the manufacturing method, it was discovered that the particles had spread over a wide area outside the core layer, even all the way to the carbon fiber layers. Doctor blade B had a similar structure as doctor blade A in other respects, but the resistance to heat of the resin used was better, and the manufacturing method was pultrusion, whereby the location of the silicon carbide particles in the core of the blade structure was more controlled than in the method used for the manufacture of blade B.

Figure 3A:
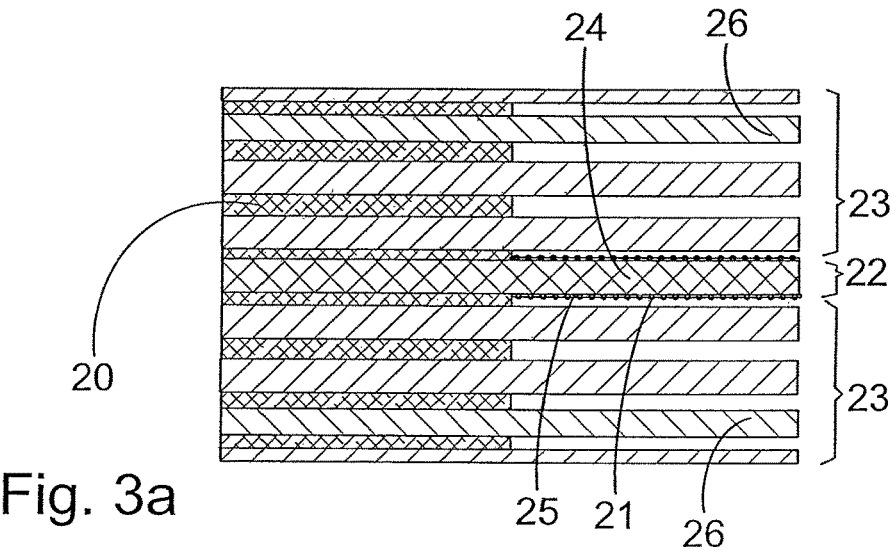
FIG. 3a shows the principle of the structure of the doctor blade according to the invention, which structure contains one conditioning reinforcement fiber layer.
Figure 3B:
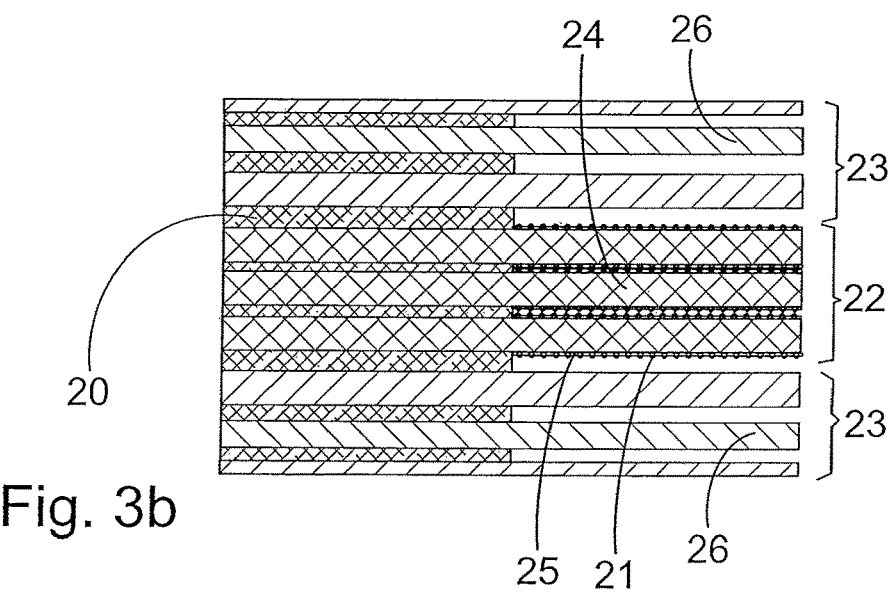
FIG. 3b shows the principle of the structure of the doctor blade according to the invention, which structure contains three conditioning reinforcement fiber layers.

Several doctor blades C according to the invention were also manufactured. The reinforcement fiber layers, silicon carbide particles and resin were similar to those in doctor blade A, but the carbon fiber layers used were thinner than in doctor blades A and B. Generally speaking, the surface fiber layers 23 include carbon fiber layers 26, the grammage (areal density i.e., mass per unit of area) of which is 15-25 percent smaller than in the reinforcement fiber layers 24 of the fiber core 22. Doctor blade C had the following layer structure listed from the upper surface to the lower surface:

layer of fiberglass; 100 g/m$^2$
layer of carbon fiber; 200 g/m$^2$
layer of fiberglass; 250 g/m$^2$
three layers of fiberglass; 250 g/m$^2$
and silicon carbide (SiC) particles
layer of fiberglass; 250 g/m$^2$
layer of carbon fiber; 200 g/m$^2$
layer of fiberglass; 100 g/m$^2$ The above-described layer structure has been presented in FIG. 3b, where the three center-most fiberglass mats contain silicon carbide particles. The silicon carbide particles 21 in the resin coating 25 are described by the coarse double oblique lines. The untreated fiberglass mats are described by the oblique lines running diagonally up to the right. The fiberglass layer is generally referred to with number 24. Similarly, the carbon fiber mats 26 are described by the oblique lines running diagonally up to the left. The resin coating 25 restricts the absorption of the epoxy matrix into the fiber, whereby the unabsorbed fiber layer is in a way flattened more in a press than an absorbed fiber layer. The unabsorbed fiber layers are interlaced with respect to each other tightly, forming a more homogeneous core fiber structure, where both the reinforcement fiber/matrix mixture ratio and the particle distribution are more controlled than in prior art doctor blades. This has been illustrated in FIGS. 3a-4b by using a small distance of untreated fiberglass mats to each other and to untreated reinforcement fiber layers. The structure can also be seen in the microscopic image taken of an actual doctor blade (FIG. 2a). The symmetry of the doctor blade is not as evident in FIG. 2a as it is in the schematic FIGS. 3a-4b. This is due to the fact that the microscopic image has been taken of a used doctor blade at the location of the blade bevel, and due to the inaccuracies of the angle of view and the photography technique. The sampling point (FIG. 1c) covers the entire thickness of the doctor blade, like the illustrations in principle shown in FIGS. 3a-4b. For reasons of clarity, the epoxy matrix 20 has only been described in half of the sampling point in FIGS. 3a-4b using dense double oblique lines. In the press, the reinforcement fiber layers are pressed against each other, and they become cross-linked to form a strong composite structure.

Figure 3C:
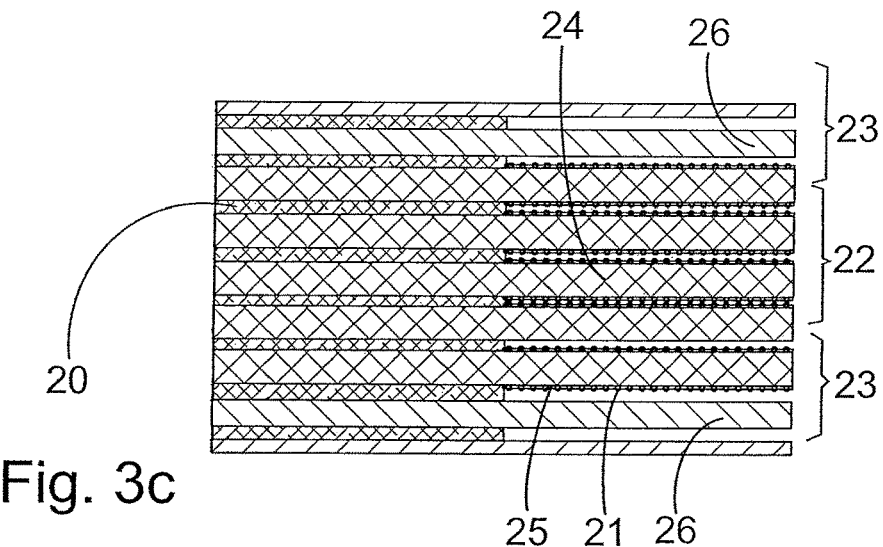
FIG. 3c shows the principle of the structure of the doctor blade according to the invention, which structure contains five conditioning reinforcement fiber layers.
Figure 4A:
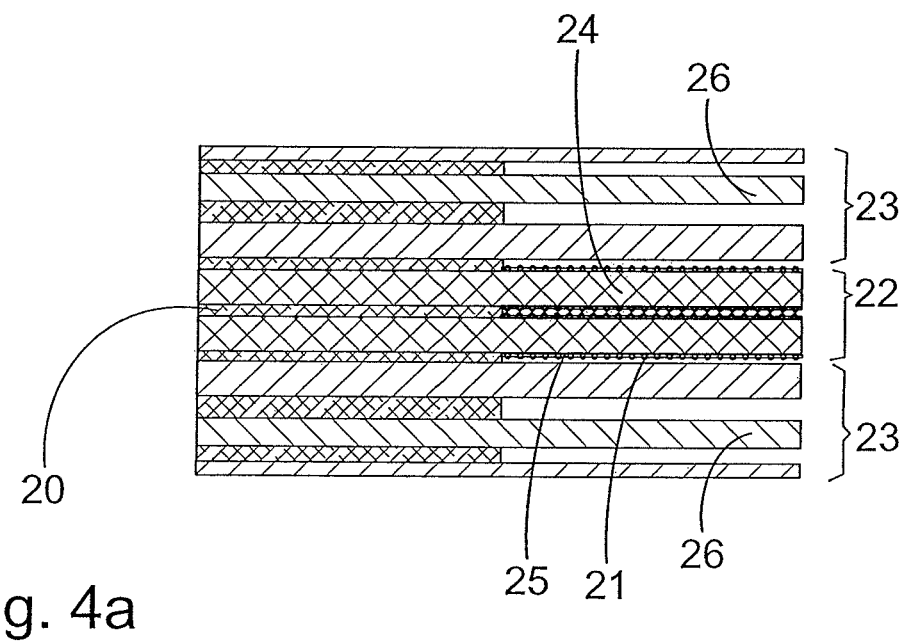
FIG. 4a shows the principle of the structure of the doctor blade according to the invention, which structure contains two conditioning reinforcement fiber layers.
Figure 4B:
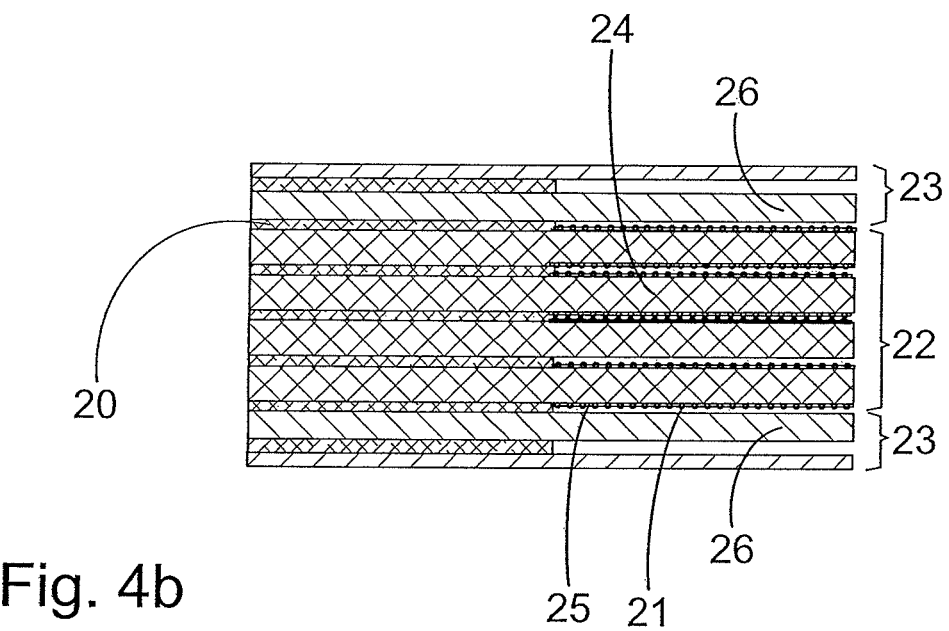
FIG. 4b shows the principle of the structure of the doctor blade according to the invention, which structure contains four conditioning reinforcement fiber layers.

In FIGS. 3a-3c, the fiber core has one, three or five treated fiberglass layers, in which case the structure of the doctor blade is fully symmetrical with respect to the centermost fiberglass mat. In FIGS. 4a and 4b, the fiber core has two or four treated fiberglass layers and one untreated fiberglass mat less. In this case, the structure of the doctor blade is symmetrical with respect to the center line of the blade, in other words with respect to the so-called zero line.

The width of the laminate manufactured was 700 mm After the cutting of the edges, the laminate was cut into six strips. The strips are doctor blades C1-6, which were tested in the test device described above. Below is a summary of the results of the wear test.

|  | thickness | width A | width L | wear, mm/h |
|---|---|---|---|---|
| Blade C1 | 1.45 mm | 76.03 | 69.47 | 0.33 |
| Blade A | 1.50 mm | 76.84 | 52.39 | 1.22 |
| Blade C2 | 1.47 mm | 76.11 | 69.39 | 0.34 |
| Blade C3 | 1.48 mm | 76.35 | 70.77 | 0.28 |
| Blade C4 | 1.45 mm | 75.83 | 68.24 | 0.38 |
| Blade B | 1.53 mm | 74.86 | 48.95 | 1.30 |
| Blade C5 | 1.48 mm | 76.35 | 69.13 | 0.36 |
| Blade C6 | 1.47 mm | 76.03 | 70.59 | 0.27 |

The first column is the identifier of the doctor blade tested. Doctor blades A and B are prior art references, which only contain one treated carbon fiber layer in the middle of the doctor blade. The second column shows the thicknesses of the doctor blades in millimeters. Next are the widths of the doctor blades at the beginning of the wear test (width A) and at the end of the wear test (width L). These measurements have then been used for calculating the wear of each doctor blade (millimeters per hour).

It can be clearly seen from the results of the wear test that the wear of the doctor blades according to the invention was considerably smaller than the wear of the reference doctor blades A and B. The wear is approximately 20-30% of the prior art despite the greater thickness and greater carbon fiber content of the doctor blades A and B and despite the consequently slower than assumed wear. What was particularly surprising was the better wear resistance as compared to doctor blade B, whose manufacturing method was more precise.

Figure 2B:
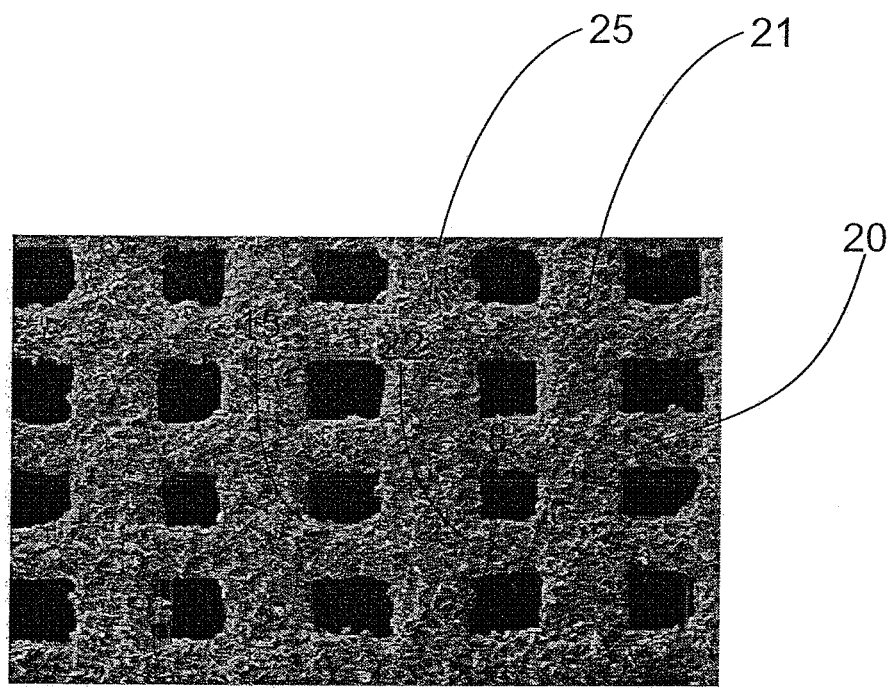
FIG. 2b shows a microscopic image of the conditioning reinforcement fiber mat according to the invention.

The pre-coating of the fiberglass mats with epoxy before the particle addition also differs from prior art, in which case the treated fiberglass mat becomes dry, in other words it contains and absorbs little resin. The pre-coating and particle addition of the fiberglass mat are performed before pressing and in a device different from the device used for the treatment of carbon fibers and surface fiberglass. Instead of being mixed into the matrix, the silicon carbide particles were spread onto dry fiberglass mat for example as a curtain or by spraying with or without an auxiliary substance. In this case, the silicon carbide particles remain as an even layer on the surface of the fiberglass mat (FIG. 2b). Generally speaking, the resin coating is essentially on the entire area of the fiberglass layer. When using an auxiliary substance, the use of a volatile auxiliary substance or an auxiliary substance containing a volatile component increased the dryness of the fiberglass mat. At the same time, it was possible to accurately determine the amount and location of the silicon carbide particles, and it was possible to easily control the mixture ratio of the silicon carbide particles and resin. The small resin content of the fiber core and the dense fiber/particle structure minimizes the melting of the epoxy matrix by the effect of friction heat, and the resulting clogging of the doctor blade. This, in turn, enables the minimization of the amount of carbon fiber in the doctor blade. As a result, the scratching of polymeric surfaces in particular is reduced, but the doctor blade still wears less than what is known from prior art. However, the doctor blade can be manufactured cost-effectively by pressing.

We claim:

1. A doctor blade for a fiber web machine comprising:
   a fiber core having a cross-machine length, a machine direction width, a Z-direction thickness, a first side in the Z-direction and a second side opposite the first side in the Z direction, and is formed of at least two reinforcement fiber layers laminated on top of one another in a first epoxy matrix, each reinforcement fiber layer comprising a fiberglass mat with fibers predominantly extending in the machine direction, each said mat having exterior surfaces spaced in the Z direction, and wherein essentially all the exterior surfaces of the fiberglass mats are precoated with epoxy resin to form epoxy external surfaces outwardly of each mat exterior surface, and wherein at least a portion of each epoxy external surface has a selected amount of silicon carbide particles placed thereon, such that the amount, location, and a mixture ratio of the silicon carbide particles and epoxy resin exterior to each mat within each reinforcement layer is limited by the epoxy external surface;
   a first side part having surface layer(s) of fiber in a second epoxy matrix, bonded to the fiber core first side, and a second side part having surface layer(s) of fiber in a third epoxy matrix, bonded to the fiber core second side; and
   wherein the fiber core has a first epoxy matrix weight percentage, and the first side part has a second epoxy matrix weight percentage, and the second side part has a third epoxy matrix weight percentage, and wherein the first epoxy matrix weight percentage is less than the second epoxy matrix weight percentage and less than the third epoxy matrix weight percentage.

2. The doctor blade of claim 1 wherein the fiber core first epoxy matrix weight percentage is 10-25 percent less than the second epoxy matrix weight percentage, and the third epoxy matrix weight percentage.

3. The doctor blade of claim 2 wherein the fiber core first epoxy matrix weight percentage is 15-20 percent less than the second epoxy matrix weight percentage, and the third epoxy matrix weight percentage.

4. The doctor blade of claim 1 wherein the fiber core includes 2 to 5 fiberglass layers.

5. The doctor blade of claim 1 wherein the fiber core includes 2 to 4 fiberglass layers.

6. The doctor blade of claim 1 wherein the silicon carbide particles have a grain size of GRIT600.

7. The doctor blade of claim 1 wherein the first epoxy matrix weight percentage of the fiber core is 30-35 percent.

8. The doctor blade of claim 7 wherein the second epoxy matrix weight percentage, and the third epoxy matrix weight percentage are between 35-45 percent.

9. The doctor blade of claim 1 wherein the doctor blade is a pressed laminate.

10. The doctor blade of claim 1 wherein the first side part fiber layers and second side parts fiber layers include carbon fiber layer(s) of a grammage which is 15-25 percent smaller than that of the fiber layers of the fiber core.

11. The doctor blade of claim 1 wherein the thickness of the doctor blade in the Z direction is from one to two millimeters.

12. The doctor blade of claim 1 wherein the exterior surfaces of the fiberglass mats precoated with epoxy resin is essentially on an area of the fiberglass layer(s) defined by two times the length times the width of the fiber core.

13. A doctor blade for a fiber web machine comprising:
    a plurality of reinforcement fiber layers laminated on top of one another into an epoxy matrix wherein reinforcement fibers predominantly extend in a machine direction;
    wherein the plurality of reinforcement fiber layers form a first side part and a second side part with a core therebetween;
    wherein the core has at least two epoxy matrix layers separated by reinforcement fibers in a matrix which predominantly extends in the machine direction;
    wherein the at least two epoxy matrix layers are substantially composed of a mixture of epoxy matrix and silicon carbide particles; and
    wherein the epoxy matrix of the core has a weight percentage of epoxy matrix that is 10-25 percent less than that of the first and second side parts.

14. The doctor blade of claim 13 wherein the core epoxy matrix weight percentage is 15-20 percent less than that of the first and second side parts.

15. The doctor blade of claim 13 wherein the fiber core includes 2 to 5 fiberglass layers, each layer separated by an epoxy matrix layer substantially composed of a mixture of epoxy matrix and silicon carbide particles.

* * * * *